May 2, 1967  H. A. STORCH  3,317,228
TAPER BOLT ASSEMBLY
Original Filed March 18, 1964  2 Sheets-Sheet 1
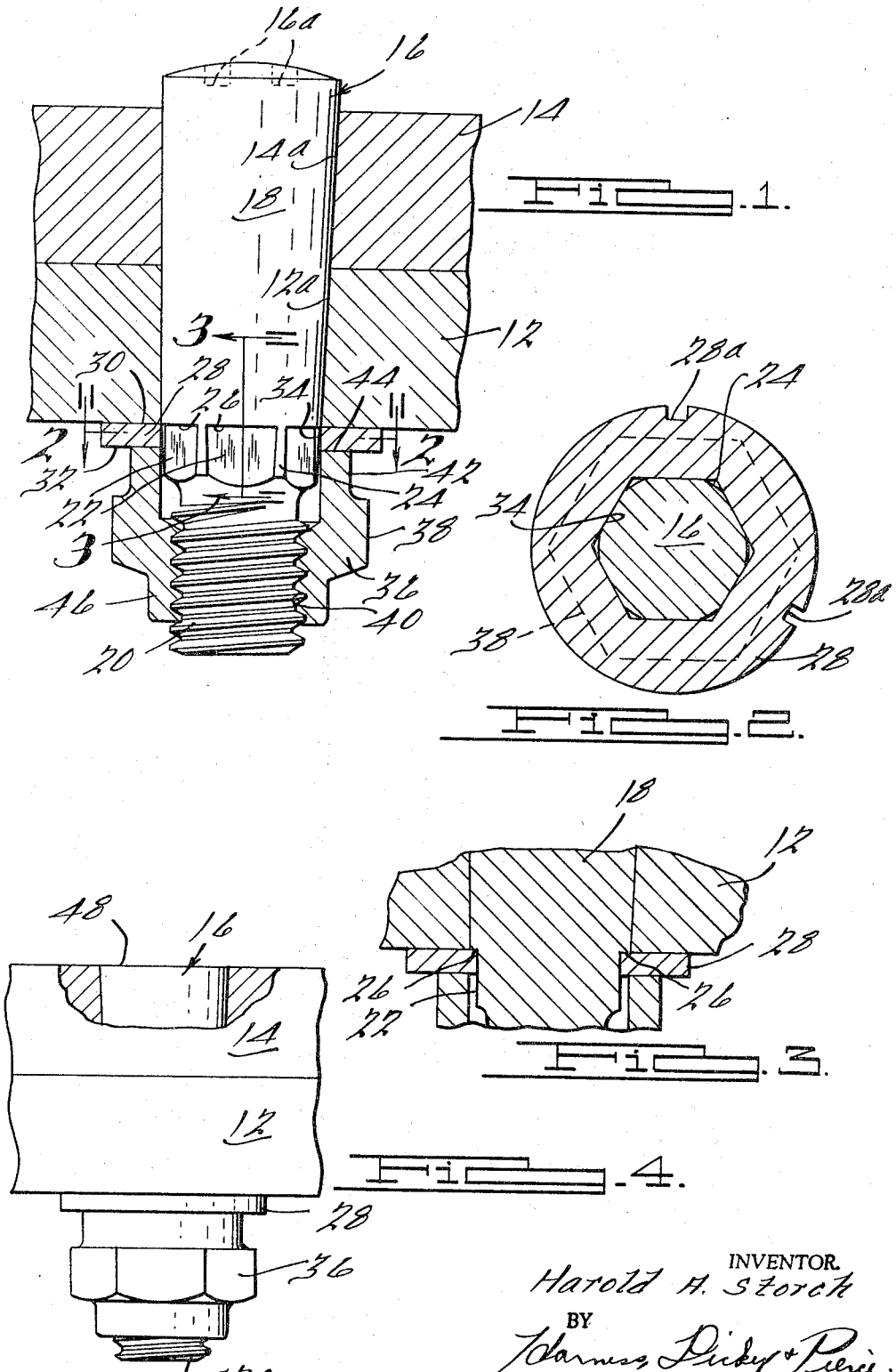
INVENTOR.
Harold H. Storch
BY
Harness, Dickey & Pierce.
ATTORNEYS.

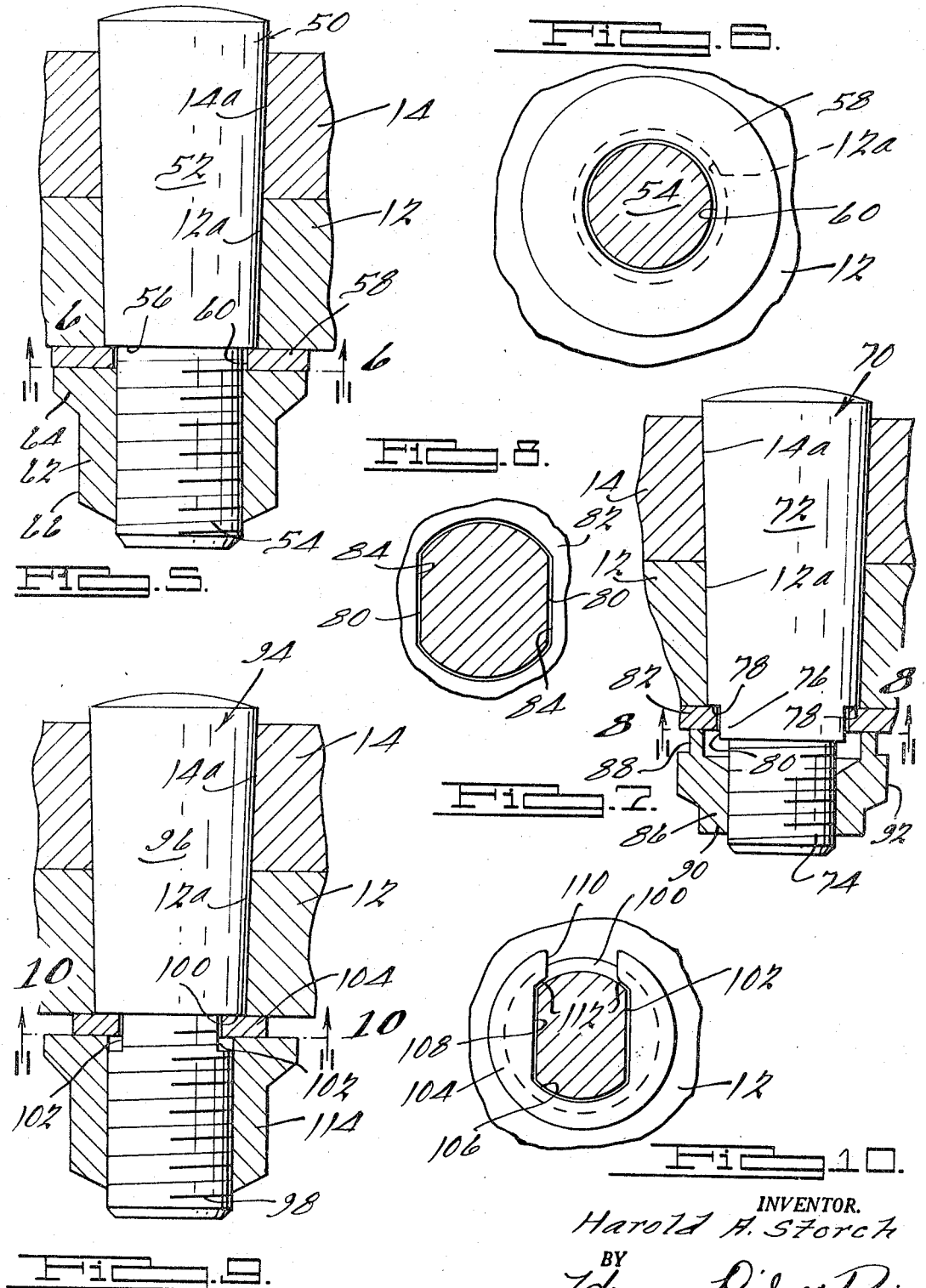

United States Patent Office 3,317,228
Patented May 2, 1967

3,317,228
TAPER BOLT ASSEMBLY
Harold A. Storch, Birmingham, Mich., assignor to Federal Screw Works, Detroit, Mich., a corporation of Michigan
Continuation of application Ser. No. 352,758, Mar. 18, 1964. This application Apr. 11, 1966, Ser. No. 549,093
4 Claims. (Cl. 287—189.36)

This invention relates to fasteners and particularly to a taper bolt assembly, and is a continuation of my co-pending patent application of the same title, Ser. No. 352,758, filed Mar. 18, 1964, now abandoned.

The structure of the present invention is characterized by a bolt having an elongated tapered body portion which is received in the aligned holes of two or more members to be secured together, said holes having their aperture defining surfaces lying on a common cone. The bolt is formed with a radial shoulder and a threaded terminal portion at the small diameter end of the tapered body portion. A nut and a washer are applied to the bolt with the washer being held against one of the joined members and the bolt being drawn into apertures until the shoulder thereof engages the washer. An interference fit exists between the bolt and the members to be joined and the accurate location of the shoulder on the bolt assures that the degree of interference will be of a precisely controlled magnitude. While the taper bolt assembly of the present invention may be used in a variety of applications, it has been particularly designed for and is uniquely adapted to fastening sheet metal members in aircraft frame construction.

It is an object of the present invention to provide a taper bolt assembly in which the tapered portion of the bolt seats fully against the members to be joined throughout the length of the interfitting surfaces, and wherein the bolt bears with substantially equal force against all portions of the surfaces against which it seats.

It is another object of the present invention to provide a taper bolt assembly of the above character which is of reliable long lasting construction, and which avoids localized high stress areas or any other condition liable to produce stress corrosion.

It is still another object of the present invention to provide a taper bolt construction wherein the preparation of the holes in the members to be joined is simplified and in which relatively inexpensive tooling is required.

It is another object of the present invention to provide a taper bolt assembly of improved strength and reliability and which may be manufactured, installed, and inspected in a convenient manner and at a reasonable cost.

These and other objects of the present invention will become apparent from the following detailed description taken in conjunction with the accompanying drawings, wherein:

FIGURE 1 is a vertical diametrical sectional view of a taper bolt assembly embodying the principles of the present invention;

FIG. 2 is a cross-sectional view of the structure of a taper bolt in FIG. 1 taken along the line 2—2 thereof;

FIG. 3 is a sectional view of the structure illustrated in FIG. 1 taken along the line 3—3 thereof;

FIG. 4 is an elevational view of the structure illustrated in FIG. 1, the one end of the bolt having been ground flush with a surface of one of the members joined;

FIG. 5 is a view of structure similarly illustrated in FIG. 1 showing another form of the invention;

FIG. 6 is a sectional view of the structure illustrated in FIG. 5 taken along the line 6—6 thereof;

FIG. 7 is a view of the structure similarly illustrated in FIG. 1 showing still another form of the present invention;

FIG. 8 is a sectional view of the structure illustrated in FIG. 7 taken along the line 8—8 thereof;

FIG. 9 is a view of structure similarly illustrated in FIG. 1 showing still another modification of the present invention; and FIG. 10 is a sectional view of the structure illustrated in FIG. 9 taken along the line 10—10 thereof.

Referring now to the drawings and particularly to FIGS. 1 to 3, the invention will be seen to comprise a taper bolt assembly utilized to secure together a pair of members 12 and 14 in abutting face to face relation. A taper bolt 16 is shown passing through the members 12 and 14. The member 12 has a tapered opening 12a and the member 14 has an opening 14a. The surfaces defining the openings 12a and 14a lie on a common cone. In practice, the openings 12a and 14a are formed by first drilling holes through the members 12 and 14 with such members in the overlapping position shown. Next, a tapered reamer is inserted in the drilled holes, simultaneously reaming the holes 12a and 14a to the shape and size illustrated.

The taper bolt 16 has a tapered body portion 18 extending for the major portion of its length with a threaded portion 20 being formed at the opposite end of the bolt 16 from the large diameter and of the tapered portion 18. The small diameter end 24 of the tapered portion 18 is formed with a plurality of external flats 22, which are shown as being six in number and are equally spaced. The flats 22 are disposed radially inwardly of the cone on which the periphery of the bolt portion 18 lies, and their formation also produces a plurality of radially extending shoulders 26, one of which lies at one end of each flat 22. A washer 28, having opposite faces 30 and 32, is received over the small diameter end 24 of the bolt portion 18. The washer face 30 lies against the exposed face of the member 12, and also abuts the bolt radial shoulders 26. The washer 28 will be seen to have an hexagonal-shaped opening 34, the flat sides of which lie against the bolt flats 22. Accordingly, the washer 28 cannot be rotated on the bolt 16.

A nut 36 will be seen to be received on the bolt 16 and is provided with an outer wrench receiving periphery 38 of the usual hexagonal cross-sectional shape. The nut 36 is additionally provided with a thread 40 and a sleeve-shaped extension 42 at the end thereof adjacent the washer 28. The end of the sleeve-shaped extension 42 has a flat annular face 44 which abuts squarely against the washer 28 and holds it against the face of the member 12 and the radial shoulders 26. A collar 46 is formed on the nut 36 at the opposite end thereof from the cylindrical extension 42. The collar 46 is inwardly deformed in one or more selected locations to render the nut self-locking on the bolt. The deformation of a nut collar 46 to form the nut into a lock nut is well known to those familiar with lock nuts. The sleeve-like extension 42 of the nut 36 has its inner diameter spaced radially outwardly of the threads 40 and spacedly surrounds the small diameter 24 of the bolt.

When the bolt 16 is first inserted into the openings 12a and 14a, the washer is applied to the bolt from the threaded end thereof and the nut 36 is started on the threaded portion 20. It will be seen that the bolt 16 is provided with a pair of spaced recesses 16a at the large diameter end thereof for the reception of a spanner wrench to prevent rotation of the bolt. By this means the nut can be rotated readily on the bolt despite the tendency of the collar 46 to grip the bolt and rotate the bolt with it. As the nut is turned down, the bolt 16 will be drawn or wedged into the openings 12a and 14a, outwardly deforming the material defining said openings by a minute amount. Thus, an interference fit is produced between the taper bolt portion 18 and the openings 12a and 14a.

The tapered bolt portion 18 is drawn into the openings 12a and 14a until the shoulders 26 of the bolt come into abutment with the washer 28. At this point, further entry of the bolt into the members 12 and 14 is arrested. Accordingly, the location of the shoulders 26 on the bolt 16 serves to establish the degree of interference produced. It has been found that the degree of this interference must be very accurately controlled in order to produce a fastening having the desired characteristics. Once the nut is drawn into place, the assembly may be inspected with the use of a torque wrench. If the nut cannot be backed off with a predetermined torque, then it is known that the bolt is at least as tight as it should be. If desired, the large diameter end of the bolt may be ground to form an end surface 48 (FIG. 4) which is flush or coplanar with the exposed face of the member 14. This would ordinarily be done if this end of the bolt were in an exposed location.

In practice, all of the parts shown in FIGS. 1 to 3 may be formed from a titanium alloy when used in aircraft airframe fasteners. Of course, other materials can also be used. It will be appreciated that the bolt is formed to very accurate dimensions. In prior applications it has been common to form a head at the large diameter end of the tapered body portion of a taper bolt. This has been found to have several undesirable features. One principal objection is that it is impossible for the bolt to seat equally on both its head and on its elongated tapered portion, and high stress areas are set up which have a tendency to cause stress corrosion. It will be seen that structure of the present invention eliminates the use of a head and the necessity of machining a compound conical seat in the members to be joined.

Because of the strength of the metals from which the members 12 and 14 are formed, there is very little, if any, likelihood of the bolt 16 being pulled entirely through the openings 12a and 14a. Furthermore, in the applications for which this fastener is intended, load applications are high shear rather than high tensile. It is also to be pointed out that the tapered portion 18 of the bolt 16 may have a variety of different tapers within the framework of the present invention. For example, various tapers from ¼ inch to 9/10 of an inch per foot are commonly used in tapered pin or tapered bolt applications and any of such tapers could be used in connection with the bolt of the present invention.

FIGS. 5 and 6 illustrate a simplified form of the present invention in which a bolt 50 is illustrated as interconnecting the members 12 and 14. The bolt 50 will be seen to have an elongated tapered body portion 52 and a threaded terminal portion 54 projecting from the small diameter end of the tapered portion 52. A continuous annular radially extending shoulder 56 is formed at the small diameter end of the tapered portion 52 adjacent the threaded portion 54. A washer 58 will be seen to be fitted over the bolt tapered portion 54 and engages both the annular shoulder 56 and the exposed face of the member 12. The washer 54 has an opening 60 of slightly larger diameter than the bolt threaded portion 54. A nut 62 is threaded onto the threaded portion 54 of the bolt and has a flange at one end thereof which seats flatly against the washer 58. The end 66 of the nut 62 opposite from the flange 64 is preferably indented in one or more selected locations to afford the nut 62 a self-locking action. This may be done as described in my copending patent application Ser. No. 168,069, filed Jan. 25, 1962, entitled "Lock Nut," now Patent No. 3,171,459. However, other arrangements and forms of indentations to produce self-locking action are well known.

In the embodiments of FIGS. 5 and 6 it will be apparent that the washer 58 is free to rotate on the threaded portion 54 of the bolt and the nut 62 is not insulated from any vibration or angular movement of the member 12. This is in distinction to the embodiment of FIGS. 1 to 4 wherein the washer 28 is non-rotatably fitted on the bolt to insulate the nut 36 from any forces which might tend to rotate it off of the threaded portion 20 of the bolt. However, the embodiment of FIGS. 5 and 6 will be seen to be of a more simplified form and is, thus, less expensive. Furthermore, the embodiment of FIGS. 5 and 6 retains the same feature of the invention in providing abutment means which is engageable with a radial shoulder on the bolt to determine the magnitude of interference fit between the bolt tapered portion and the surfaces defining the tapered openings 12a and 14a in the members 12 and 14, respectively.

FIGS. 7 and 8 show a taper bolt 70 having an elongated tapered body portion 72 and a threaded smaller diameter portion 74 at the small diameter end of the tapered body portion 72. An intermediate portion 76 of partially circular cross-section is formed on the bolt 70 between the tapered portion 72 and the threaded portion 74. The intermediate portion 76, being of smaller diameter than the small diameter end of the tapered body portion 72, leaves a continuous annular radial shoulder 78 on the bolt at the one end of the tapered body portion 72. A pair of opposed flats 80 are formed on opposite sides of the intermediate portion 76 and a washer 82 is positioned over said intermediate portion. The washer 82 has an aperture provided with a pair of opposed flats 84 adapted to lie in engagement with the flats 80 of the bolt to prevent rotation of the washer 82 on the intermediate bolt portion 76.

A nut 86 is threaded on the bolt portion 74 and is provided with a sleeve-like extension 88 at one end thereof which spacedly surrounds and passes over the intermediate portion 76 to abut the washer 82 and hold it against the shoulder 78 and against the exposed face of the member 14. A collar 90 at the opposite end of the nut from the sleeve-like extension 88 may be inwardly deformed to give the nut self-locking action on the bolt.

In the embodiment of FIGS. 7 and 8 the bolt intermediate portion 76 is separately formed from the tapered body portion 72. The intermediate portion 76 serves a washer receiving function and holds the washer 82 against rotation. This insulates the nut from any forces which might tend to rotate it off the bolt. The embodiment of FIGS. 7 and 8, like the prior embodiments, incorporates a bolt shoulder which limits the extent to which the bolt is drawn into the members to be joined and controls the magnitude of interference fill between the bolt and said members.

In the embodiment of FIGS. 9 and 10, it will be seen that a taper bolt 94 has an elongated tapered body portion 96 and a threaded portion 98 at the small diameter end of the tapered portion 96. The bolt 94 has an annular radially extending shoulder 100 at the small diameter end of the tapered body portion 96, and a pair of opposed slots 102 formed in the threaded portion 98 adjacent the shoulder 100. A washer 104 is received over the threaded portion 98 and in the slots 102. The shape of the washer, which is illustrated in FIG. 10, provides an opening 106 which has a pair of flat surfaces 108 spaced radially inwardly of the diameter of the bolt portion 98 and adapted to lie against the bottoms of the slots 102. The bottoms of the slots 102 will be seen to be flat and the engagement of the washer in these slots prevents rotation of the washer 104 on the bolt 94. The washer 104 has a slot 110 formed in one side thereof providing an opening between the outer periphery of the washer and the central opening 106. Portions 112 of the washer 104 lying adjacent the slots 110 engage the threaded portion 98 of the bolt to aid in preventing rotation of the washer on the bolt. The slots 102 are of an axial length greater than the thickness of the washer, thus permitting the washer to move axially along the threaded portion 98 of the bolt as a nut 114 is threaded down on the bolt portion 98 until the washer 104 abuts against the shoulder 100, at which time the bolt will have been drawn into place. The washer 104 is deformed or expanded to permit its insertion over the threaded portion 98 of the bolt and into place in slots 102. The arrangement of FIGS. 9 to 10 is such that if the nut 114 should come off the bolt 98, the washer 104 will still hold the bolt on and prevent the complete disassembly of the bolt from the members 12 and 14.

From the foregoing it will be apparent that each of the embodiments of the invention illustrated herein depicts a taper bolt assembly in which the bolt may be drawn into its tapered openings an accurately measured and precise amount, without the necessity of impairing the uniform bearing contact of the periphery of the tapered bolt portion with the tapered surfaces of the openings in which it is received. In each embodiment of the invention the large diameter end of the tapered body portion may either be left projecting from the exposed face of one of the members or may be ground flush with that face, depending upon the particular requirements of the application in which the fastening is used. It will also be apparent that in each of the embodiments suitable means may be provided on the washer or on the bolt by which the bolt may be held against rotation as the nut is threaded on or the torque of the nut is inspected. For example, in the embodiment of FIGS. 1 to 4, slots or recesses 28a are formed in the washer 28 for the reception of a spanner wrench. Such wrench-receiving means may be particularly desirable in inspecting the assembly to make sure that the nut has been threaded onto the bolt with a predetermined torque.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. The combination comprising a pair of members having aligned tapered apertures, said members being positioned with their respective apertures converging toward a point spaced from one face of one of said members, fastening means having a headless tapered body portion received in said apertures and in engagement with the surface of each of said members defining its respective aperture, said fastening means further having a male threaded portion extending away from said one face of one of said members and away from the other of said members, a female threaded member axially threaded onto said male threaded end portion, means including said female threaded member operatively reacting against said one member for urging said members toward each other upon threading of said female threaded member onto said male threaded end portion, and abutment means independent of either of said pair of members providing means positively engaged by said female threaded member for limiting the axial distance said female threaded member is threaded onto said male threaded end portion and the force applied to urge said members toward each other, said abutment means comprising in part means formed integrally with said fastening means adjacent said tapered body portion and a washer received upon the fastening means and in engagement with the abutment means, the female threaded member being operatively reactive against the one member by engagement with one side of said washer, the other side of said washer engaging said one member.

2. The combination as set forth in claim 1 wherein the washer has an opening therein substantially complementary in shape to the portion of the fastening means upon which it is received.

3. The combination as set forth in claim 2 wherein the tapered body portion has a taper substantially within the range of ¼" to 9/10" per foot of length.

4. The combination as set forth in claim 2 wherein the washer is formed from a material having at least the same hardness as the material from which the female threaded member is formed.

References Cited by the Examiner
UNITED STATES PATENTS

| 824,382 | 6/1906 | Quitman | 151—38 |
| 3,034,611 | 5/1962 | Zenzic | 85—1 |
| 3,099,470 | 7/1963 | Zumbusch | 85—1 |

CARL W. TOMLIN, *Primary Examiner.*

THOMAS F. CALLAGHAN, *Examiner.*

R. S. BRITTS, *Assistant Examiner.*